Patented Aug. 3, 1937

2,089,151

UNITED STATES PATENT OFFICE 2,089,151

PROCESS OF PREPARING THE HORMONE OF SUPRARENAL CORTEX

Carl Ludwig Lautenschläger, Frankfort-on-the-Main, Heinz Öppinger, Hofheim, Taunus, Otto Schaumann, Wiesbaden, and Rudolf Rigler and Rudolf Fussgänger, Frankfort-on-the-Main, Germany, assignors to Winthrop Chemical Company, Inc., New York, N. Y., a corporation of New York No Drawing. Application January 21, 1935, Serial No. 2,840. In Germany January 23, 1934

6 Claims. (Cl. 167—77)

Our present invention relates to a process of preparing the hormone of suprarenal cortex.

In our co-pending application Serial No. 713,606, filed March 1, 1934, we have described a process for obtaining preparations of suprarenal cortex free from 1-(3.4-dihydroxy-phenyl)-2-methylamino-ethanol-1, wherein the suprarenal cortex or any desired preparation obtained therefrom, or the total suprarenal capsule or a preparation obtained therefrom, is treated with formaldehyde or a compound capable of yielding formaldehyde and, if necessary, the excess of formaldehyde is eliminated after the treatment is complete.

For example, a magma of suprarenal cortex is mixed with a small quantity of formaldehyde; the mixture is allowed to stand for some time and the excess of formaldehyde is then destroyed with ammonia. The product thus obtained can be worked up so as to produce a dry substance or some other preparation of suprarenal cortex. With the same success suprarenal cortex in the form of powder can be subjected to the process. In this case the procedure may be as follows: the powder is suspended in water so as to form a magma and the magma is treated with formaldehyde. It also suffices to expose the powder of the gland directly to the vapors of formaldehyde and after the removal of the last traces of formaldehyde with ammonia vapors and a subsequent extraction there are obtained extracts which are free from dihydroxy-phenyl-methylaminoethanol. The formaldehyde is preferably used in a moderate excess, that is to say, slightly more than 1 mol. of formaldehyde per mol. of dihydroxy-phenyl-methylaminoethanol contained in the cortical substance of the suprarenal capsule.

When extracts of the cortical substance of the suprarenal capsule are under treatment it is advisable to add the solution of formaldehyde only until all of the dihydroxy-phenyl-methylaminoethanol is just bound.

The process can be applied to the total suprarenal capsule because not only the dihydroxy-phenyl-methylaminoethanol contained in the cortical substance of the suprarenal capsule but the whole dihydroxy-phenyl-methylaminoethanol contained in the medulla is destroyed, that is to say, is inactivated by the treatment with formaldehyde.

The following specific examples are illustrative:

(1) 1 gram of dry powder of the suprarenal capsule containing 15 milligrams of dihydroxyphenyl-methylaminoethanol is suspended in 10 cc. of water or alcohol of 80 percent strength and the suspension is rendered just alkaline by means of sodium bicarbonate. After the addition of 0.5 cc. of a formaldehyde solution of 2 percent strength the suspension is allowed to stand for about ½ to 1 hour and is then centrifuged. 1 cc. of the solution thus obtained corresponding to an original content of 1.5 milligrams of dihydroxy-phenyl-methylaminoethanol does not cause the slightest raising of the blood pressure.

(2) 5 grams of dry powder of the suprarenal cortex are exposed in a closed vessel to the vapors of 2 to 3 cc. of an aqueous formaldehyde solution. After 30 to 60 minutes the formaldehyde solution is eliminated, the powder is subjected to a reduced pressure and the residual formaldehyde is bound by ammonia vapors. The powder is evacuated again to remove an excess of ammonia, then extracted with 50 cc. of Ringer solution and centrifuged. The solution thus obtained does not cause a raising of the blood pressure.

(3) 100 cc. of a press juice of the suprarenal capsule freed from albumin by ultrafiltration and having a total content of 500 milligrams of dihydroxy-phenyl-methylaminoethanol are rendered alkaline with sodium bicarbonate and mixed with 3 cc. of a formaldehyde solution of 3.5 percent strength. After the mixture has been allowed to stand for a short time, while stirring, the content of dihydroxy-phenyl-methylaminoethanol, measured by blood pressure, has nearly completely disappeared. The extract is rendered just acid to litmus paper by means of dilute hydrochloric acid and can then directly be used.

Now we have found that when preparing solutions of the hormone of suprarenal cortex which are free from 1-(3.4-dihydroxy-phenyl)-2-methylamino-ethanol-1 according to the process of the application above referred to it is advantageous, particularly on a commercial scale, first to precipitate by the addition of ammonia the chief quantity of 1-(3.4-dihydroxy-phenyl)-2-methylamino-ethanol-1 contained in the extracts and to eliminate by filtration the 1-(3.4-dihydroxyphenyl)-2-methylamino-ethanol-1 which is precipitated when the liquid is allowed to stand. When the solutions thus preliminarily purified are treated with formaldehyde or a compound capable of yielding formaldehyde according to the process of our co-pending application above referred to the small amounts of 1-(3.4-dihydroxy-phenyl)-2-methylamino-ethanol-1 still contained in the extracts are inactivated. In order to avoid any decomposition of the hormone of suprarenal cortex the 1-(3.4-dihydroxy-phenyl)-2-methylamino-ethanol-1 is precipitated with ammonia in the cold and any considerable excess of ammonia is preferably avoided.

The procedure may be, for instance, as follows: The extracts of suprarenal cortex obtained by any desired process are gradually mixed, while well cooling, with a dilute aqueous ammonia solution until the solution shows a distinct ammoniacal reaction. The whole is allowed to stand in ice, and then the 1-(3.4-dihydroxy-phenyl)-2-methylamino-ethanol-1 which has separated is filtered by suction or centrifuged. For the further treatment of the filtrate according to the specification above referred to the excess of ammonia need not previously be neutralized, since the excess of ammonia is transformed by means of formaldehyde into hexamethylenetetramine. With the same success the process may also be carried out by eliminating the 1-(3.4-dihydroxy-phenyl)-2-methylamino-ethanol-1 with the aid of ammonia while preparing the extracts; the total suprarenal capsule or the suprarenal cortex is, for instance, extracted with feebly ammoniacal water, the resultant aqueous extract is freed from undissolved matter and then subjected to the treatment described in our above-named copending application.

The process of our present invention involves the advantages that it allows the simultaneous commercial production of the hormone of suprarenal medulla and of the hormone of suprarenal cortex and that the resultant extract solutions of the hormone of suprarenal cortex contain but small quantities of non-specific ballast substances.

The following examples illustrate the invention:

1. Fresh suprarenal capsules are ground and extracted with water to which per liter 1 to 2 cc. of concentrated ammonia solution have been added. During the extraction care is taken that the mixture remains just feebly ammoniacal. The solution is expressed from the gland material and filtered. The residue is once more extracted in the same manner with ammonia water. The combined extracts are quickly neutralized and concentrated to 1/10 of their volume. The concentrate still contains a small quantity of 1-(3.4-dihydroxy-phenyl)-2-methylamino-ethanol-1 which is inactivated by the treatment with formaldehyde described in the specification above referred to.

2. A suprarenal extract made by any desired process and having a high content of 1-(3.4-dihydroxy-phenyl)-2-methylamino-ethanol-1 is concentrated in a vacuum in an atmosphere of carbon dioxide until 1 cc. of the solution corresponds with about 10 to 15 grams of gland material. Concentrated ammonia solution is added, while well cooling, until turmeric paper assumes a distinct brown coloration. Friction with a glass rod starts the crystallization of the 1-(3.4-dihydroxy-phenyl)-2-methylamino-ethanol-1. As soon as the precipitation is complete the whole is filtered by suction and in order to eliminate any 1-(3.4-dihydroxy-phenyl)-2-methylamino-ethanol-1 still in solution the filtrate is treated with formaldehyde according to the process of the specification above referred to. The solution is then feebly acidified with hydrochloric acid.

Since in some cases the ammonium salts produced by the process of this invention should preferably be avoided, the extracts may be mixed with dilute caustic soda solution until neutral and only then be treated with ammonia solution. Only very small quantities of ammonia solution are consumed by adding to the generally acid or neutral suprarenal extract a small quantity of ammonia solution or an aqueous solution of an ammonium salt such as ammonium chloride and then adding dilute caustic soda solution until the combined ammonia is disengaged and the 1-(3.4-dihydroxy-phenyl)-2-methylamino-ethanol-1 precipitated.

We claim:

1. In the process of preparing the hormone of suprarenal cortex free from 1-(3.4-dihydroxyphenyl)-2-methylamino-ethanol-1 the steps which comprise causing to act upon the suprarenal capsule at first ammonia and then a substance of the group consisting of formaldehyde and compounds capable of splitting off formaldehyde.

2. In the process of preparing the hormone of suprarenal cortex free from 1-(3.4-dihydroxyphenyl)-2-methylamino-ethanol-1 the steps which comprise causing to act upon the suprarenal capsule at first ammonia and then a substance of the group consisting of formaldehyde and compounds capable of splitting off formaldehyde and then eliminating the excess of formaldehyde.

3. In the process of preparing the hormone of suprarenal cortex free from 1-(3.4-dihydroxyphenyl)-2-methylamino-ethanol-1 the steps which comprise causing to act upon the suprarenal cortex at first ammonia and then a substance of the group consisting of formaldehyde and compounds capable of splitting off formaldehyde.

4. In the process of preparing the hormone of suprarenal cortex free from 1-(3.4-dihydroxyphenyl)-2-methylamino-ethanol-1 the steps which comprise causing to act upon the suprarenal cortex at first ammonia and then a substance of the group consisting of formaldehyde and compounds capable of splitting off formaldehyde and then eliminating the excess of formaldehyde.

5. In the process of preparing the hormone of suprarenal cortex free from 1-(3.4-dihydroxyphenyl)-2-methylamino-ethanol-1 the steps which comprise extracting fresh suprarenal capsules with water containing 1 to 2 cc. of concentrated aqueous ammonia solution per liter and causing an aqueous solution of formaldehyde to act upon the concentrated extract.

6. In the process of preparing the hormone of suprarenal cortex free from 1-(3.4-dihydroxyphenyl)-2-methylamino-ethanol-1 the steps which comprise causing concentrated aqueous ammonia solution to act upon a concentrated extract of the suprarenal capsule, eliminating the precipitate and causing an aqueous solution of formaldehyde to act upon the filtrate.

CARL LUDWIG LAUTENSCHLÄGER.
HEINZ OPPINGER.
OTTO SCHAUMANN.
RUDOLF RIGLER.
RUDOLF FUSSGÄNGER.